No. 655,835. Patented Aug. 14, 1900.
W. O. SHADBOLT.
WAGON.
(Application filed Sept. 28, 1898.)
(No Model.) 4 Sheets—Sheet 1.
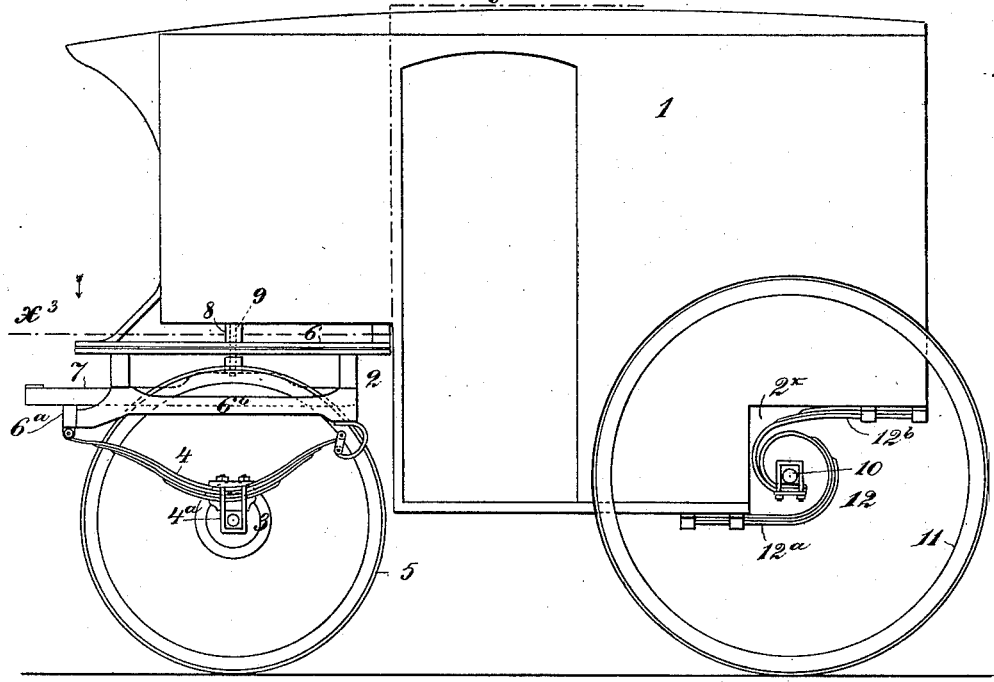
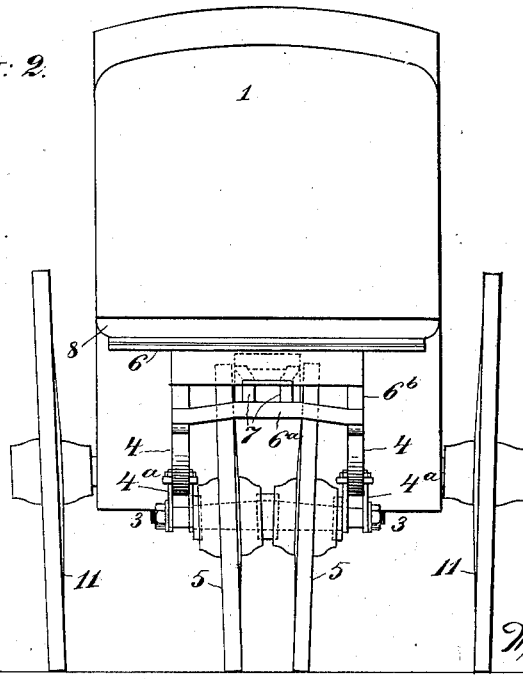
WITNESSES: INVENTOR
William Oscar Shadbolt
BY
ATTORNEY No. 655,835. Patented Aug. 14, 1900.
W. O. SHADBOLT.
WAGON.
(Application filed Sept. 28, 1898.)
(No Model.) 4 Sheets—Sheet 2.
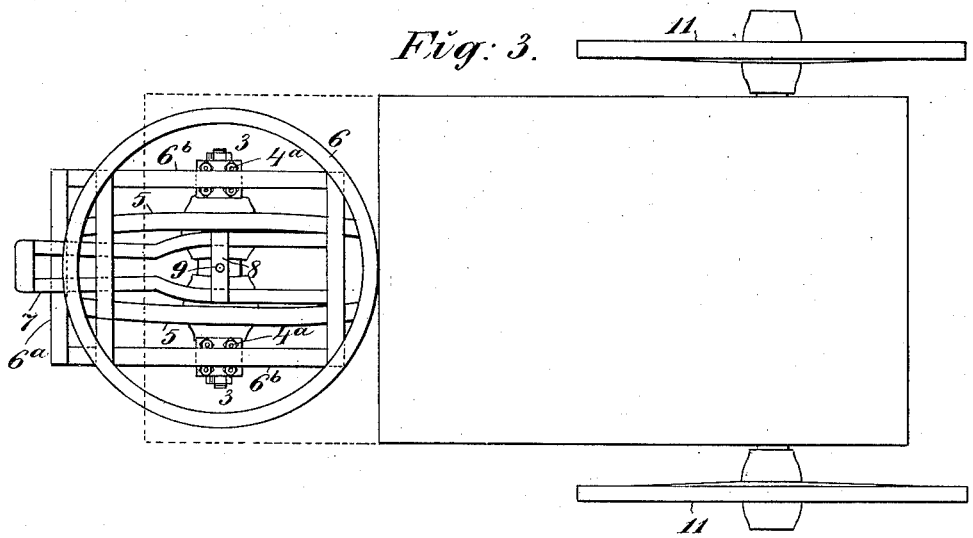
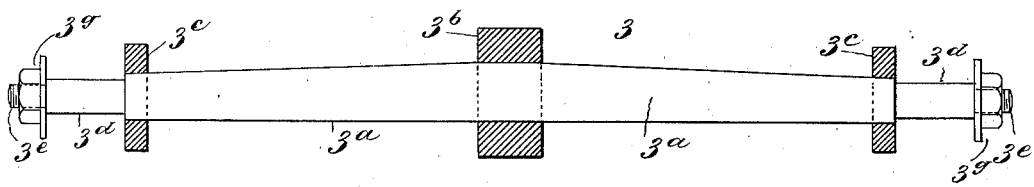
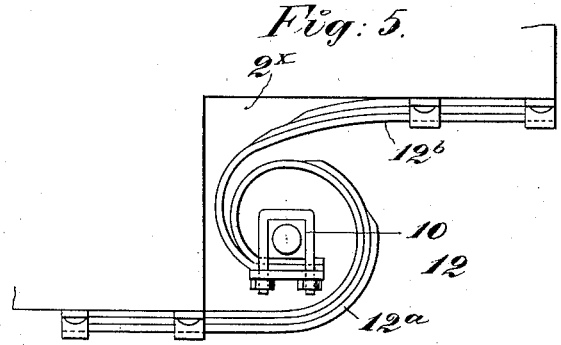
WITNESSES:
INVENTOR
William Oscar Shadbolt
BY
Henry Connett
ATTORNEY No. 655,835. Patented Aug. 14, 1900.
W. O. SHADBOLT.
WAGON.
(Application filed Sept. 28, 1898.)
(No Model.) 4 Sheets—Sheet 3.
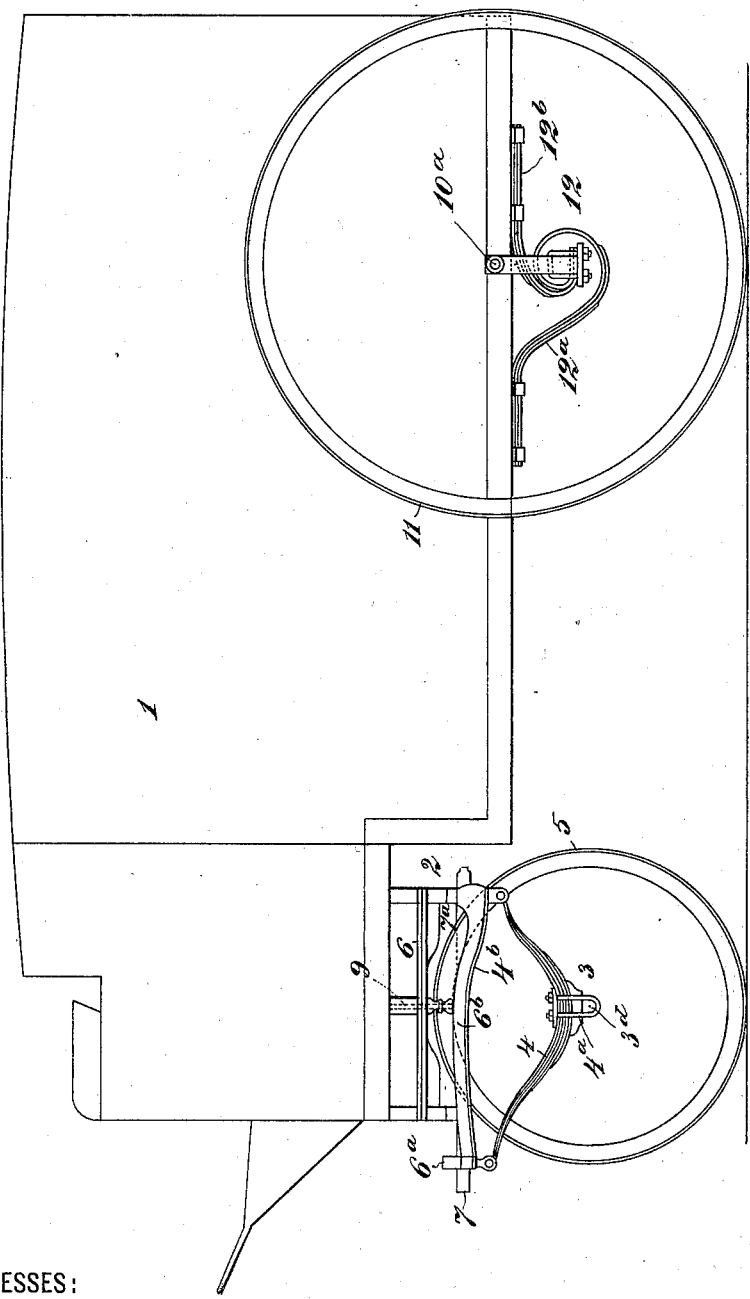
WITNESSES:
INVENTOR
William Oscar Shadbolt
BY
ATTORNEY No. 655,835. Patented Aug. 14, 1900.
W. O. SHADBOLT.
WAGON.
(Application filed Sept. 28, 1898.)
(No Model.) 4 Sheets—Sheet 4.
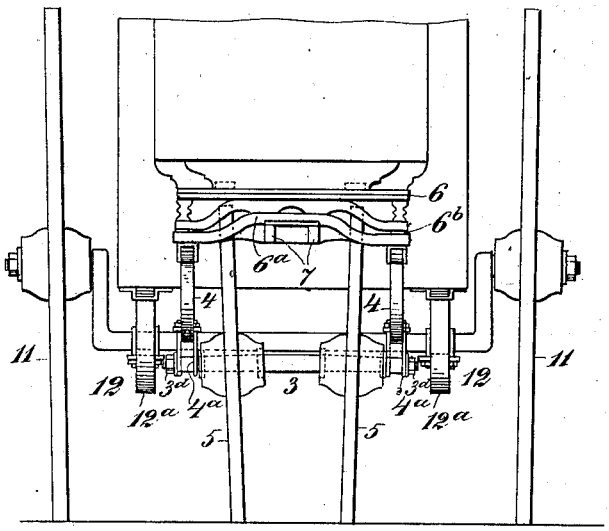
Fig: 7.
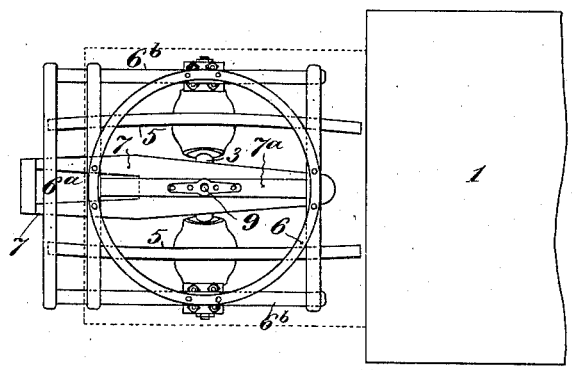
Fig: 8.
WITNESSES:
J. W. Winman
Peter A. Ross
INVENTOR
William Oscar Shadbolt
BY
Henry Connett
ATTORNEY
THE NORRIS PETERS CO., PHOTO-LITHO., WASHINGTON, D. C.

UNITED STATES PATENT OFFICE.

WILLIAM OSCAR SHADBOLT, OF NEW YORK, N. Y.

WAGON.

SPECIFICATION forming part of Letters Patent No. 655,835, dated August 14, 1900.

Application filed September 28, 1898. Serial No. 692,071. (No model.)

*To all whom it may concern:*

Be it known that I, WILLIAM OSCAR SHADBOLT, a citizen of the United States, residing in the city of New York, borough of Brooklyn, in the county of Kings and State of New York, have invented certain new and useful Improvements in Wagons or Vehicles, of which the following is a specification.

This invention relates to four-wheeled vehicles or wagons; and it has especial reference to those with low or drop bodies and with a bay under the front part of the body in which the front wheels turn. In this general class of vehicles, of which milk-wagons, ice-wagons, &c., are types, several disadvantages arise from the more common and heretofore-proposed constructions. Where the body depends between the front wheels, the wagon cannot be turned short and cannot, therefore, be used in narrow and crowded streets. Where there is a bay formed under the front part of the body and the front wheels are spaced in the ordinary way, the body must extend back so far as to destroy a great deal of space in the body, and if this space be restored by extending the deeper portion of the body to the rear such disproportion is produced in the body and the weight is thrown so disproportionately on the axles that the draft on the vehicle is much increased. It will be obvious that where only a single front wheel is used some of the above disabilities are overcome; but the single wheel has itself very objectionable features, one of the more important being its inability to rotate when the horses are being turned at right angles to the body or the vehicle is being turned short. Such a vehicle is also lacking in stability, and as the single wheel is brought directly under the king-bolt the platform forming the top of the bay must be proportionately elevated, and this reduces the available room in the body. To overcome these defects in a vehicle having a drop-body is one of the principal objects of the present invention, which will now be described with reference to the accompanying drawings, wherein it is illustrated as embodied in a milk-wagon.

In the drawings, Figure 1 is a side elevation of the wagon. Fig. 2 is a front elevation thereof; and Fig. 3 is a sectional plan, the plane of the section being indicated by the line $x^3$ in Fig. 1. Fig. 4 is an enlarged view of the front axle, and Fig. 5 is an enlarged view of one of the springs at the rear or hind axle. Figs. 6, 7, and 8 are views corresponding to Figs. 1, 2, and 3, respectively, and illustrating a slightly-different embodiment of the invention.

1 is the drop-body as a whole. The details of the body are not illustrated, as they are not material to the invention. It will be noted that there is a bay 2 formed under the front end of the body to receive or provide room for the front wheels, their axle, the fifth-wheels, &c. It is important in the construction of this class of vehicles that the main portion of the body shall depend low enough and that this deep portion shall extend as far forward as possible consistent with the employment of two front wheels of sufficient size adapted to turn under the body, so that the front axle may occupy a position at right angles to the rear axle.

3 is the front axle; 4 4, the two front springs; 5 5, the two front wheels; 6, the fifth-wheels; 7, the hounds; 8, the king-bolt block, and 9 the king-bolt.

$6^a$ is the splinter-bar or front transverse member of the fifth-wheel frame, and $6^b$ represents the side members of said frame.

In a construction of this character it is desirable to limit the size of the bay 2 as much as possible both as to its vertical depth and its extension rearwardly, and to attain this object I employ two front wheels, bring them quite close together, and secure the springs 4 4 or other equivalent supports to the respective outer ends of the relatively-short axle 3, exterior to the wheels, thereby bringing the wheels laterally within the limits of the fifth-wheel frame, the sides of which rest on the springs. As the king-bolt comes between the wheels, this construction permits the fifth-wheels and their frame to be set down low and the vertical depth of the bay 2 to be thus reduced.

Fig. 4 shows more in detail the construction and form of the front axle 3. It will be noted that this axle consists, practically, of two tapered axle-arms $3^a$, separated by a central collar $3^b$, the axes of the arms being out of alinement to an extent sufficient to bring the rims of the two front wheels nearer together at the ground than at their crowns, as seen in Fig. 2. On the outer ends of the arms are loose hub-washers 3$^c$. Beyond these are spring-arms 3$^d$ to receive the clips 4$^a$ of the springs, and still beyond these arms are screw-threaded extensions 3$^e$ to receive broad nuts 3$^g$. The spring-arms 3$^d$ will be as large as can be conveniently formed on the end of the axle-arm 3$^a$ and be of the proper length to receive the spring-blocks and springs. The middle or central collar 3$^b$ may be about two inches across the face and be shrunk onto the axle, or two collars may be used. It will be noted that the front wheels are included laterally within the space circumscribed by the fifth-wheel and within the width of the narrowest part of the body. In Figs. 1 and 5 the preferred construction of the rear portion of the body 1 for this kind of wagon and the preferred construction of the rear springs are fully illustrated. In order to avoid the use of a cranked axle, a shallow bay 2$^x$ is formed in the rear end of the bottom of the drop-body, and the rear axle 10 occupies a position in this bay. The rear or hind wheels 11 may be mounted in the usual way on this axle. The spring 12, supporting the rear portion of the body on the axle 10, is composed of two members or elements 12$^a$ and 12$^b$, both formed of laminæ or plates, Fig. 5, and secured to the body, one in front of the axle 10 and the other back of the same. The member 12$^a$ in front of the axle is attached to the bottom of the lowest portion of the body, extends rearwardly, curves upwardly about and over the axle, and is secured thereto by clips. The member 12$^b$ is attached to the bottom of the bay 2$^x$, above the level of the member 2$^a$, extends forward, curves downward about the axle, and is secured thereto at the same point with the member 12$^a$. Thus the weight of the body is distributed between the two members of the spring.

It will be obvious that with my construction of a drop-body vehicle, above described, I obtain all of the advantages due to the use of two front wheels without the disadvantages arising from a long axle and the advantages of compactness due to the use of a single front wheel without its several disadvantages in vehicles of this kind.

Springs are commonly employed in this class of vehicles for supporting the body on the front axle; but where springs are not desirable rigid supports may be substituted therefor without departing from the spirit of my invention. The arms 3$^d$ on the front axle, to which the springs or other supports are secured, are herein shown as square in cross-section; but this is not material to my invention, nor are the nuts 3$^g$ essential. They are merely convenient precautionary devices to prevent the clips from slipping off the arms 3$^d$ if they should become loosened.

In Figs. 6, 7, and 8 I have shown my invention applied to a wagon for transporting dead horses and the like and have illustrated in it some slight modifications of the construction. As to the front part of the wagon the portion of the body above the bay 2 is made somewhat narrower than the drop portion, the front wheels are set a little wider apart than in the construction of Figs. 1 to 3, and the fifth-wheels 6 are of less diameter. The hounds 7 are constructed of one piece forked to form jaws at the front end, and on this piece forming the hounds is fixed a block-piece 7$^a$, into which the king-bolt enters. The clips on the fifth-wheel frame, to which the ends of the spring 4 are coupled, are connected together by a metal strip or plate 4$^b$. (Seen in Fig. 6.) The arm 3$^d$ on the end of the axle-arm 3$^a$, to which the spring is secured, is not square, but forms a cylindrical continuation of the arm 3$^a$, the upper surface being flattened off to form a seat for the block which supports the spring. At the rear or hinder part of the wagon the hind axle 10$^a$ is cranked, and the spring 12 has its two members secured to the body on the same level. Obviously this form of spring may be employed for supporting the front end of the body as well as the rear end.

One of the characteristic features of this invention is the employment of fifth-wheels of large diameter extending out laterally beyond the front wheels and the arrangement of the springs or other supports for the front end of the body directly over the non-rotative axle at the sides of the wheels and between the ends of said axle and the side members of the fifth-wheel frame.

Having thus described my invention, I claim—

1. A gear for the front of a drop-body vehicle, comprising fifth-wheels and their frame, a non-rotative axle, two wheels rotatively mounted on said axle between the side members of said frame, and supports between the respective ends of said axle and said frame and fixed to the axle exterior to the wheels, substantially as set forth.

2. A gear for the front end of a drop-body vehicle, comprising fifth-wheels 6 and their frame, an axle, two wheels rotative thereon, and springs between the respective ends of the axle and said frame, exterior to the wheels, and fixed to said axle and frame, substantially as set forth.

3. A four-wheeled vehicle having a drop-body with a bay at its front end, fifth-wheels and their frame within said bay, a non-rotative front axle, two front wheels rotative thereon, and supports for the body, laterally exterior to the wheels and between the axle and the horizontally-rotative part of the fifth-wheel frame, said bay extending entirely across the body, whereby the front gear may be turned on the king-bolt through ninety degrees, substantially as set forth.

4. The combination with the drop-body of the vehicle, having a bay at its front end extending entirely across the body and open at the sides thereof, of the fifth-wheels 6 and their frame, situated within said bay, the front axle 3, the springs connecting the respective ends of said axle with the fifth-wheel frame, and the two front wheels 5, mounted rotatively on said axle between said springs, substantially as set forth.

5. As an article of manufacture, the vehicle-spring 12, consisting of two tapered members, $12^a$ and $12^b$, connected together at their thinner ends, the former having a quarter-turn bend and the latter a three-quarter-turn bend, and the arms of the members extending in opposite directions, substantially as set forth.

6. In a vehicle, the combination with the rear axle, of a spring 12, comprising the front member $12^a$ and rear member $12^b$, said front member extending rearwardly and curving upward over the axle toward the front and said rear member extending forward and curving down over the axle, said spring members being secured to said axle.

7. A vehicle having a drop-body with a bay at its rear end, a rear axle within said bay, and rear springs connecting said axle with the body, said springs each consisting of a front member $12^a$, fixed to the drop portion of the body and extending rearwardly and about the said axle, and a rear member $12^b$, attached to the elevated rear portion of the body and extending forward and about the said axle, both spring members being secured to the axle.

In witness whereof I have hereunto signed my name, this 21st day of September, 1898, in the presence of two subscribing witnesses.

W. OSCAR SHADBOLT.

Witnesses:
HENRY CONNETT,
PETER A. ROSS.